United States Patent
Johnson et al.

(10) Patent No.: US 6,647,303 B1
(45) Date of Patent: Nov. 11, 2003

(54) FEEDER/PROGRAMMING/BUFFER CONTROL SYSTEM AND CONTROL METHOD

(75) Inventors: Simon B. Johnson, Kirkland, WA (US); George Leland Anderson, Bothell, WA (US); Lev M. Bolotin, Kirkland, WA (US); Bradley Morris Johnson, Edmonds, WA (US); Mark Sean Knowles, Maple Valley, WA (US); Carl W. Olson, Renton, WA (US); Vincent Warhol, Woodinville, WA (US)

(73) Assignee: Data I/O Corporation, Redmond, MA (US)

( * ) Notice: Subject to any disclaimer, the term of this patent is extended or adjusted under 35 U.S.C. 154(b) by 0 days.

(21) Appl. No.: 09/418,901

(22) Filed: Oct. 15, 1999

(51) Int. Cl.⁷ .............................................. G06F 19/00
(52) U.S. Cl. ......................... 700/95; 700/121; 700/119
(58) Field of Search ............................ 700/86, 95, 112, 700/121, 219, 213, 220, 236, 247; 29/825, 829

(56) References Cited

U.S. PATENT DOCUMENTS

| | | | |
|---|---|---|---|
| 4,544,318 A | 10/1985 | Nagatomo et al. | 198/346 |
| 4,675,993 A | 6/1987 | Harada | 29/728 |
| 4,835,730 A * | 5/1989 | Shimano et al. | 241/14 |
| 4,917,556 A | 4/1990 | Stark et al. | 414/217 |
| 5,224,055 A | 6/1993 | Grundy et al. | 716/11 |
| 5,262,954 A | 11/1993 | Fujino et al. | 700/112 |
| 5,342,460 A | 8/1994 | Hidese | 156/64 |
| 5,533,193 A * | 7/1996 | Roscoe | 714/39 |
| 5,536,128 A | 7/1996 | Shimoyashiro et al. | 414/273 |
| 5,547,537 A | 8/1996 | Reynolds et al. | 156/351 |
| 5,692,292 A | 12/1997 | Asai et al. | 29/740 |
| 5,740,062 A | 4/1998 | Berken et al. | 700/218 |
| 5,742,393 A | 4/1998 | Landau et al. | 356/620 |
| 5,801,945 A * | 9/1998 | Comer | 700/100 |
| 5,814,375 A | 9/1998 | Hissen | 427/421 |
| 5,819,031 A | 10/1998 | Iwamoto | 709/230 |
| 5,820,679 A | 10/1998 | Yokoyama et al. | 118/719 |
| 5,896,292 A | 4/1999 | Hosaka et al. | 700/108 |
| 5,917,601 A | 6/1999 | Shimzaki et al. | 356/622 |
| 5,955,857 A | 9/1999 | Kwon et al. | 318/568.11 |
| 5,976,199 A | 11/1999 | Wu et al. | 29/25.01 |
| 5,983,277 A * | 11/1999 | Heile et al. | 709/232 |
| 5,996,004 A * | 11/1999 | White | 709/217 |
| 6,024,526 A | 2/2000 | Slocum et al. | 414/226.01 |
| 6,055,632 A | 4/2000 | Deegan et al. | 713/100 |
| 6,082,950 A | 7/2000 | Altwood et al. | 414/217 |
| 6,167,401 A | 12/2000 | Csipkes et al. | 707/10 |
| 6,229,323 B1 | 5/2001 | Tverdy et al. | 324/758 |
| 6,241,459 B1 | 6/2001 | Canella et al. | 414/798.1 |
| 6,311,282 B1 * | 10/2001 | Nelson et al. | 713/324 |
| 6,449,523 B1 | 9/2002 | Johnson et al. | 700/121 |

FOREIGN PATENT DOCUMENTS

| | | |
|---|---|---|
| EP | 0 597 637 A1 | 11/1993 |
| EP | 0 820 091 A2 | 7/1997 |
| GB | 2318664 A | 4/1998 |

OTHER PUBLICATIONS

BP–6500 In–Line Programming System brochure, BP Microsystems, Inc. 1999, 2 pages.
BP–6500 In–Line Programming System Data Sheet, BP Microsystems, Inc. 1999, 1 page.
"BP–6500 In Line Programming & Fifth Generation Technology", BP Microsystems, Inc. 1999, 7 pages.

* cited by examiner

Primary Examiner—Leo Picard
Assistant Examiner—Chad Rapp
(74) Attorney, Agent, or Firm—Mikio Ishimaru (57) ABSTRACT

A control system and method are provided having a control agent controlling a user interface, a robotic control, a programming control, and a job control. The control system is used with a feeder/programming/buffer system which has a feeder mechanism for receiving programmable devices, a robotic handling mechanism for manipulating the programmable devices among the other mechanisms, a programming mechanism for performing a programming operation on the programmable devices at a high rate of speed, and a buffer mechanism for providing the programmed programmable devices to a production assembly line on a continuous basis.

43 Claims, 3 Drawing Sheets

FEEDER/PROGRAMMING/BUFFER CONTROL SYSTEM AND CONTROL METHOD

CROSS-REFERENCE TO RELATED APPLICATION(S)

The present application contains subject matter related to a concurrently filed U.S. patent application Ser. No. 09/418,732, now U.S. Pat. No. 6,532,395 B1, by Lev M. Bolotin entitled "MANUFACTURING SYSTEM WITH FEEDER/PROGRAMMING/BUFFER SYSTEM". The related application is assigned to Data I/O Corporation, and is hereby incorporated by reference.

The present application contains subject matter related to a concurrently filed U.S. patent application Ser. No. 09/419,172, now U.S. Pat. No. 6,449,523 B1, by Bradley M. Johnson, Bryan D. Powell, Janine Whan-Tong, Carl W. Olson, Simon B. Johnson, and Lev M. Bolotin entitled "FEEDER/PROGRAMMING/BUFFER OPERATING SYSTEM". The related application is assigned to Data I/O Corporation, and is hereby incorporated by reference.

The present application further contains subject matter related to a concurrently filed U.S. patent application Ser. No. 09/419,162 by Lev M. Bolotin entitled "MANUFACTURING AND CARRIER SYSTEM WITH FEEDER/PROGRAMMING/BUFFER SYSTEM". The related application is assigned to Data I/O Corporation, and is hereby incorporated by reference.

TECHNICAL FIELD

The present invention relates generally to a manufacturing system for electronic products, and more particularly to continuous production of electronic circuit boards incorporating programmable integrated circuits.

BACKGROUND ART

In the past, certain operations of electronic circuit board assembly were performed away from the main production assembly lines. While various feeder machines and robotic handling systems would populate electronic circuit boards with integrated circuits, the operations related to processing integrated circuits, such as programming, testing, calibration, and measurement were performed in separate areas on separate equipment rather than being integrated into the main production assembly lines.

For example, in the programming of programmable devices such as electrically erasable programmable read-only memories (EEPROMs) and Flash EPROMs, separate programming equipment was used which was often located in a separate area from the circuit board assembly lines. There were a number of reasons why programming was done off-line.

First, the programming equipment was relatively large and bulky. This was because of the need to accurately insert and remove programmable devices at high speeds into and out of programming sockets in the programmer. Since insertion and removal required relatively long traverses at high speed and very precise positioning, very rigid robotic handling equipment was required. This rigidity requirement meant that the various components had to be relatively massive with strong structural support members to maintain structural integrity and precision positioning of the pick and place system moving at high speeds. Due to the size of the programming equipment and the limited space for the even larger assembly equipment, they were located in different areas.

Second, a single high-speed production assembly system could use up programmed devices faster than they could be programmed on a single programming mechanism. This required a number of programming systems which were generally operated for longer periods of time in order to have a reserve of programmed devices for the production assembly systems. This meant that the operating times and the input requirements were different between the two systems.

Third, no one had been able to build a single system which could be easily integrated with both the mechanical and electronic portions of the production assembly systems. These systems are complex and generally require a great deal of costly engineering time to make changes to incorporate additional equipment.

A major problem associated with programming the programmable devices in a separate area and then bringing the programmed devices into the production assembly area to be inserted into the electronic circuit boards was that it was difficult to have two separate processes running in different areas and to coordinate between the two separate systems. Often, the production assembly line would run out of programmable devices and the entire production assembly line would have to be shut down. At other times, the programming equipment would be used to program a sufficient inventory of programmed devices to assure that the production assembly line would not be shut down; however, this increased inventory costs. Further problems were created when the programming had to be changed and there was a large inventory of programmed integrated circuits on hand. In this situation, the inventory of programmable devices would have to be reprogrammed with an accompanying waste of time and money.

While it was apparent that a better system would be desirable, there appeared to be no way of truly improving the situation. There were a number of apparently insurmountable problems that stood in the way of improvement.

First, the operating speeds of current production assembly lines so greatly exceeded the programming speed capability of conventional programmers that the programmer would have to have a much greater through-put than thought to be possible with conventional systems.

Second, not only must the programmer be faster than existing programmers, it would also have to be much smaller. The ideal system would integrate into a production assembly line, but would do so without disturbing an existing production assembly line or requiring the lengthening of a new production assembly line over that of the length without the ideal system. Further, most of these production assembly lines were already filled with, or designed to be filled with, various types of feeding and handling modules which provide limited room for any additional equipment.

Third, any programmer integrated with the production assembly line would apparently also have to interface with the control software and electronics of the production system software for communication and scheduling purposes. This would be a problem because production assembly line system software was not only complex, but also confidential and/or proprietary to the manufacturers of those systems. This meant that the integration must be done with the cooperation of the manufacturers, who were reluctant to spend engineering effort on anything but improving their own systems, or must be done with a lot of engineering effort expended on understanding the manufacturers' software before working on the programmer's control software.

Fourth, the mechanical interface between a programmer and the production equipment needed to be highly accurate for placing programmed devices relative to the pick-and-place handling equipment of the production assembly system.

Fifth, there are a large number of different manufacturers of production handling equipment as well as production manufacturing equipment. This means that the a large number of different production assembly line configurations would have to be studied and major compromises in design required for different manufacturers.

Sixth, the ideal system would allow for changing quickly between different micro devices having different configurations and sizes.

Seventh, the ideal system needed to be able to accommodate a number of different micro device feeding mechanisms including tape, tube, and tray feeders.

Finally, there was a need to be able to quickly reject micro devices which failed during the programming.

All the above problems seemed to render an effective solution impossible.

DISCLOSURE OF THE INVENTION

The present invention provides a control system having a control agent controlling a user interface, a robotic control, a processing control, and a job control. The control system is used with a feeder/processing/buffer system which has a feeder mechanism for presenting micro devices, a robotic handling mechanism for manipulating the micro devices among the other mechanisms, a processing mechanism for performing a processing operation on the micro devices at a high rate of speed, and a buffer mechanism for providing the processed micro devices to the production assembly line on a continuous basis. The system substantially solves all the problems which previously faced such systems.

The present invention further provides a control agent controlling a plurality of subsystems. The control agent is used with a feeder/processing/buffer system which has a feeder mechanism for presenting micro devices, a robotic handling mechanism for manipulating the micro devices among the other mechanisms, a processing mechanism for performing a processing operation on the micro devices at a high rate of speed, and a buffer mechanism for providing the processed micro devices to the production assembly line on a continuous basis. The system substantially solves all the problems which previously faced such systems.

The present invention further provides a control agent controlling an error manager subsystem. The error manager subsystem is used for efficiently managing errors in a feeder/processing/buffer system which has a feeder mechanism for presenting micro devices, a robotic handling mechanism for manipulating the micro devices among the other mechanisms, a processing mechanism for performing a processing operation on the micro devices at a high rate of speed, and a buffer mechanism for providing the processed micro devices to the production assembly line on a continuous basis. The system substantially solves all the problems which previously faced such systems.

The present invention further provides a control agent controlling an event log subsystem. The even log subsystem is used for maintaining a history log of the operations of a feeder/processing/buffer system which has a feeder mechanism for presenting micro devices, a robotic handling mechanism for manipulating the micro devices among the other mechanisms, a processing mechanism for performing a processing operation on the micro devices at a high rate of speed, and a buffer mechanism for providing the processed micro devices to the production assembly line on a continuous basis. The system substantially solves all the problems which previously faced such systems.

The present invention further provides a control agent controlling a non-volatile memory subsystem. The non-volatile memory subsystem is used for maintaining operation information across power cycles regarding a feeder/processing/buffer system which has a feeder mechanism for presenting micro devices, a robotic handling mechanism for manipulating the micro devices among the other mechanisms, a processing mechanism for performing a processing operation on the micro devices at a high rate of speed, and a buffer mechanism for providing the processed micro devices to the production assembly line on a continuous basis. The system substantially solves all the problems which previously faced such systems.

The present invention further provides a control agent controlling a programmable memory subsystem. The programmable memory subsystem is used for updating operation information regarding a feeder/programming/buffer system which has a feeder mechanism for presenting micro devices, a robotic handling mechanism for manipulating the micro devices among the other mechanisms, a processing mechanism for performing a programming operation on the micro devices at a high rate of speed, and a buffer mechanism for providing the programmed micro devices to the production assembly line on a continuous basis. The system substantially solves all the problems which previously faced such systems.

The present invention further provides a control agent controlling a communications network subsystem. The communications network subsystem is used for communicating information to and regarding a feeder/processing/buffer system which has a feeder mechanism for presenting micro devices, a robotic handling mechanism for manipulating the micro devices among the other mechanisms, a processing mechanism for performing a processing operation on the micro devices at a high rate of speed, and a buffer mechanism for providing the processed micro devices to the production assembly line on a continuous basis. The system substantially solves all the problems which previously faced such systems.

The present invention further provides a control agent controlling a portable memory manager. The portable memory manager uses a PCMCIA card and is used for updating operation information regarding a feeder/processing/buffer system which has a feeder mechanism for presenting micro devices, a robotic handling mechanism for manipulating the micro devices among the other mechanisms, a processing mechanism for performing a processing operation on the micro devices at a high rate of speed, and a buffer mechanism for providing the processed micro devices to the production assembly line on a continuous basis. The system substantially solves all the problems which previously faced such systems.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
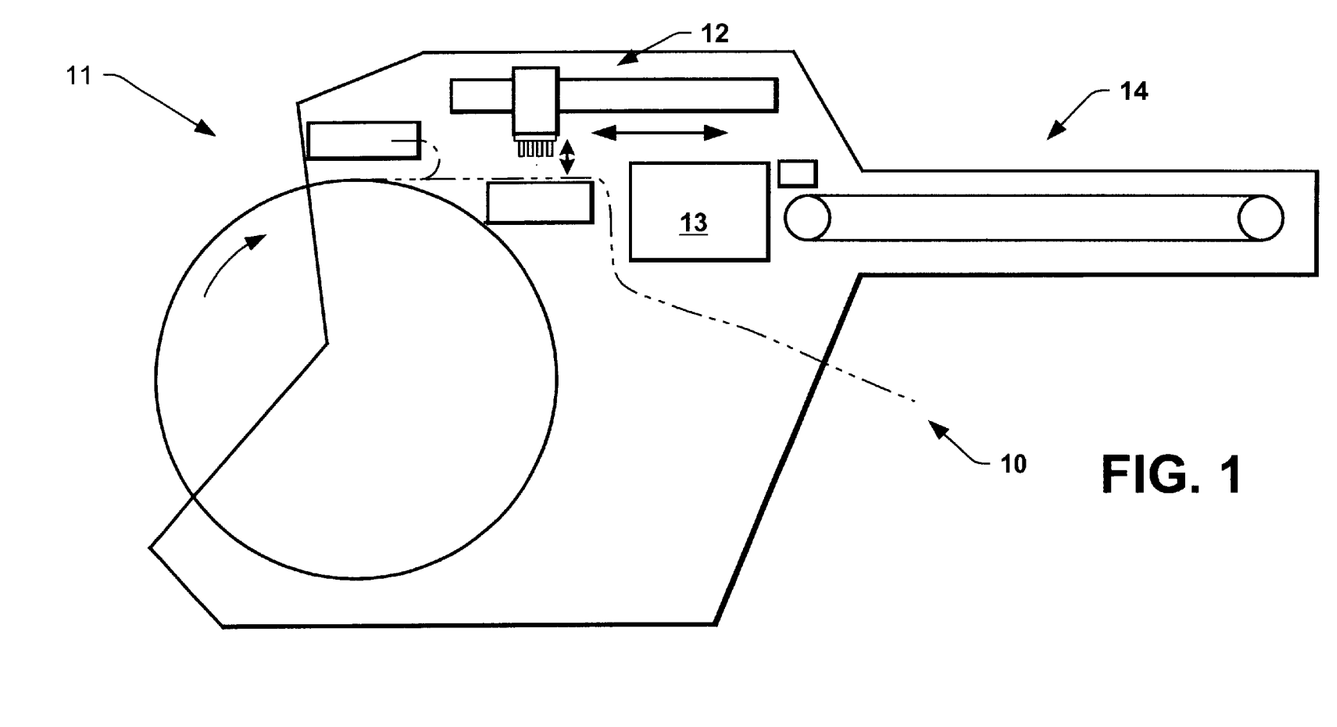
FIG. 1 is a schematic of a feeder/programming/buffer system of the present invention.

Organization:

Referring now to FIG. 1, therein is shown a feeder/programming/buffer system 10. The feeder/programming/buffer system 10 consists of an input feeder mechanism 11 for providing unprogrammed programmable devices (not shown), a robotic handling system 12 for manipulating the programmable devices in the system, a programming mechanism 13 for programming the programmable devices, and an output buffer mechanism 14 for presenting the programmed programmable devices for an assembly system (not shown). The feeder/programming/buffer system 10 is described in greater detail in the Bolotin applications, supra, but any system having similar mechanisms for performing similar finctions could incorporate the present invention.

Figure 2:
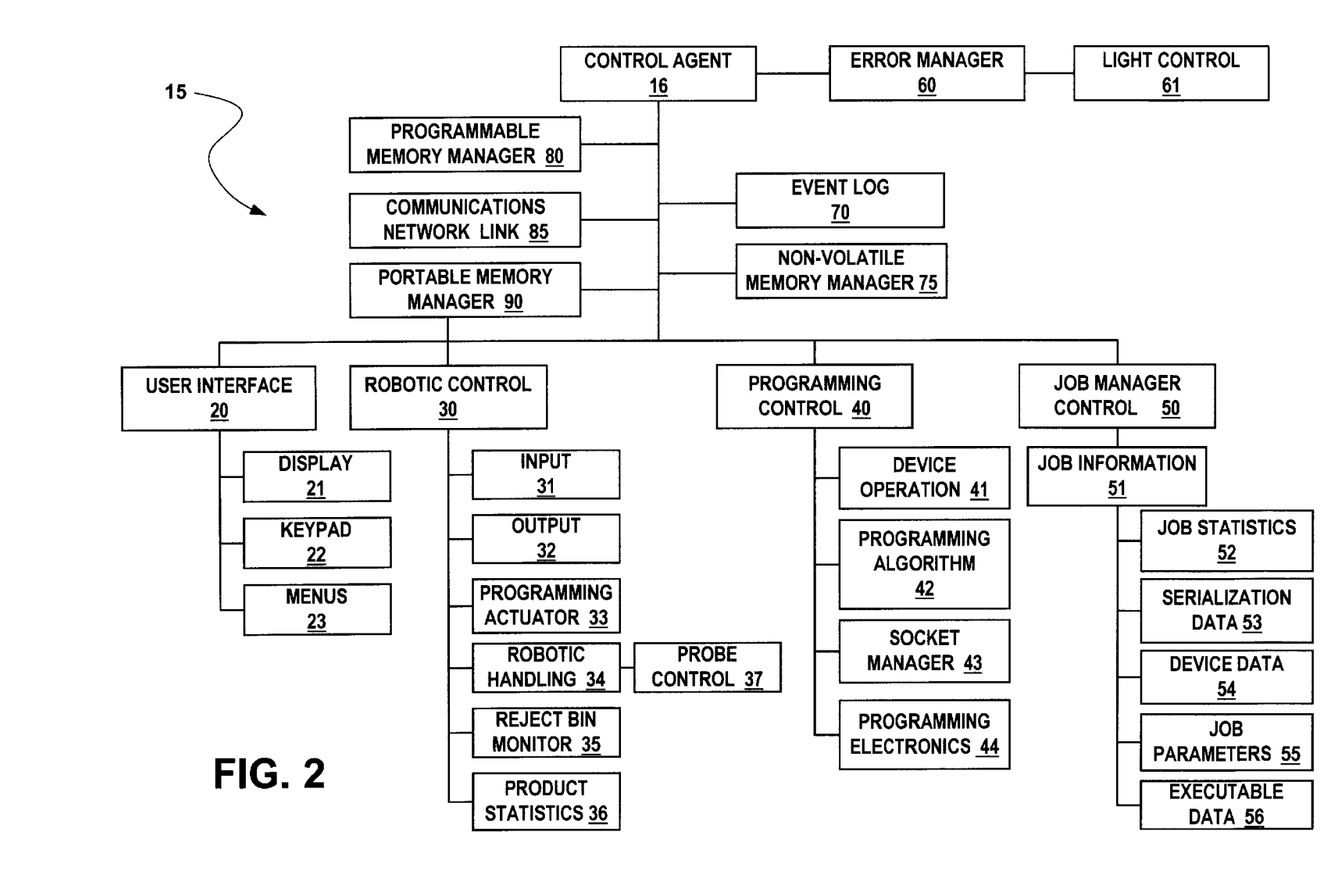
FIG. 2 is an overall schematic of the control system of the present invention.

Referring now to FIG. 2, therein is shown a control system 15 which controls the operations of the feeder/programming/buffer system 10. The control system 15 is controlled by a control agent 16, which is called a control agent since it sits over other components and subsystems for performing various subsystem operations.

The control agent 16 is connected to a user interface subsystem 20 which allows a user to input instructions regarding setup, to respond to warnings, and to start/stop the operation of the feeder/programming/buffer system 10. The user interface subsystem 20 further is interconnected to a display 21, a keypad 22, and a plurality of menu selectors 23 which step the user through the setup and the changing of various functions and/or parameters.

The control agent 16 is further connected to a robotic control subsystem 30 for the robotic handling system 12. The robotic handling system 12 performs a number of different functions which are controlled by the robotic control subsystem 30. Thus, the robotic control subsystem 30 operates an input unit 31, an output unit 32, a programming actuator unit 33, a robotic handling unit 34, a reject bin monitor 35, a product statistics unit 36, and a probe control unit 37.

The input unit 31 provides unprogrammed programmable devices. In one example, the input unit 31 controls the feed of a reel with a support tape having a plurality of pockets with each pocket containing an unprogrammed programmable device. The robotic handling unit 34 controls a movable carrier and the probe control unit 37 controls a plurality of probes on the carrier which are capable of picking the unprogrammed programmable device out of the pocket. After an unprogrammed programmable device has been picked up, the input unit 31 controls the advance of the tape to the next unprogrammed programmable device for the next of the plurality of probes under the control of the probe control unit 37 to pick up.

Under the control of the robotic handling unit 34 and the probe control unit 37, the unprogrammed programmable device is placed in the programming mechanism 13 and the programming actuator unit 33 operates a mechanism which engages unprogrammed programmable devices and disengages programmed programmable devices from the programming mechanism 13.

After programming, the robotic handling unit 34 and the probe control unit 37 cause the programmed programmable devices to be placed on the output buffer mechanism 14, which is under the control of the output unit 32. Defective programmable devices which cannot be programmed are noted by the reject bin monitor 35 and placed in a reject bin (not shown).

The output unit 32 in one mode controls a conveyor which runs under the robotic handling system 12 for the deposition of programmed programmable devices. The output unit 32 is set up to deliver a programmed programmable device when one has been removed from the conveyor by the production assembly line handling equipment (not shown).

The product statistics unit 36 keeps track of how long the feeder/programming/buffer system 10 has been turned on, and the total number of programmable devices that have been programmed.

The control agent 16 is further connected to a programming control subsystem 40 which controls the programming mechanism 13. The programming control subsystem 40 is connected to a device operation unit 41, a programming algorithm unit 42, a socket manager unit 43, and a programming electronics unit 44.

The device operation unit 41 sets up the power and ground required for the programmable device. The programming algorithm unit 42 determines the particular programmable device being programmed and its operational requirements. The socket manager unit 43 provides information for the programming algorithm unit 42 and the programming electronics unit 44 for the purpose of functionally enabling and disabling individual sockets; if there is a problem with the socket, the units will cause the socket to be by passed. The programming electronics unit 44 provides the programming for the unprogrammed programmable devices.

The control agent 16 is further connected to a job manager control 50 which is responsible for managing a particular job. The information related to the particular job is described in a job information module 51. The job information module 51 is a database which contains the following information: job statistics 52, serialization data 53, device data 54, job parameters 55, and an executable data 56.

The job statistics 52 relate to the programmable devices that have been programmed, such as how many good programmable devices, how many rejects, what type of failures, yield, and any other information desired about the programming of those programmable devices. Where the programmable devices, such as microprocessors, might have serial numbers, the serialization information is part of the serialization data 53. The device data 54 contains data regarding the programmable device itself. The job parameters 55 consist of the operations to be done, such as whether a part is to be erased, a continuity test is to be performed, an illegal bit check is to be made, or a verification of the programmable device to be performed after programming, etc.

The executable data 56 is the set of instructions for the program in which data is programmed into the programmable device. The executable data 56 controls all the pin electronics associated with the programming. It appears under the job information module 51 because it is loaded into the control system 15 as part of the job parameters 55, but the executable data 56 is actually executed by programming algorithm unit 42 of the programming control subsystem 40.

The control agent 16 is further connected to an error manager 60 which is connected to a light control 61. If something goes wrong, the error manager 60 uses the user interface subsystem 20 to control a series of lights through the light control 61 using green, yellow, and red or blue lights for normal, warning, and error, respectively. The red light is the old U.S. standard for error and the blue light is the new European standard. The error manager 60 also keeps a list of errors and displays them on the display 21.

The control agent 16 is further connected to an event log 70 which keeps track of the operation of the feeder/programming system/buffer system 10 and records problems with proper operation for warranty and troubleshooting purposes.

The control agent 16 is further connected to a non-volatile memory manager 75 which is for non-volatile random access memory (NVRAM) in the present invention. The nonvolatile memory manager 75 contains the system state information and unprocessed statistical information for the feeder/programming system/buffer system 10.

The control agent 16 is further connected to a programmable memory manager 80 which is for an electrically erasable programmable read only memory (EEPROM) in the present invention. The programmable memory manager 80 allows for permanently maintaining a record of the operation of the feeder/programming system/buffer system 10 for diagnostic and troubleshooting purposes.

The control agent 16 is further connected to a communications network link 85, which is an Ethernet connection in the present invention. The communications network link 85 will allow the control system 15 to obtain information required by the job information module 51 from a remote site as well as providing an alternate control to the user interface subsystem 20.

The control agent 16 is further connected to a portable memory manager 90 which is compatible with a PCMCIA file system. The portable memory manager 90 is capable of reading information required by the job information module 51 from a PCMCIA card.

The job statistics 52 are also obtainable by the user through the communications network link 85 or the portable memory manager 90.

Figure 3:
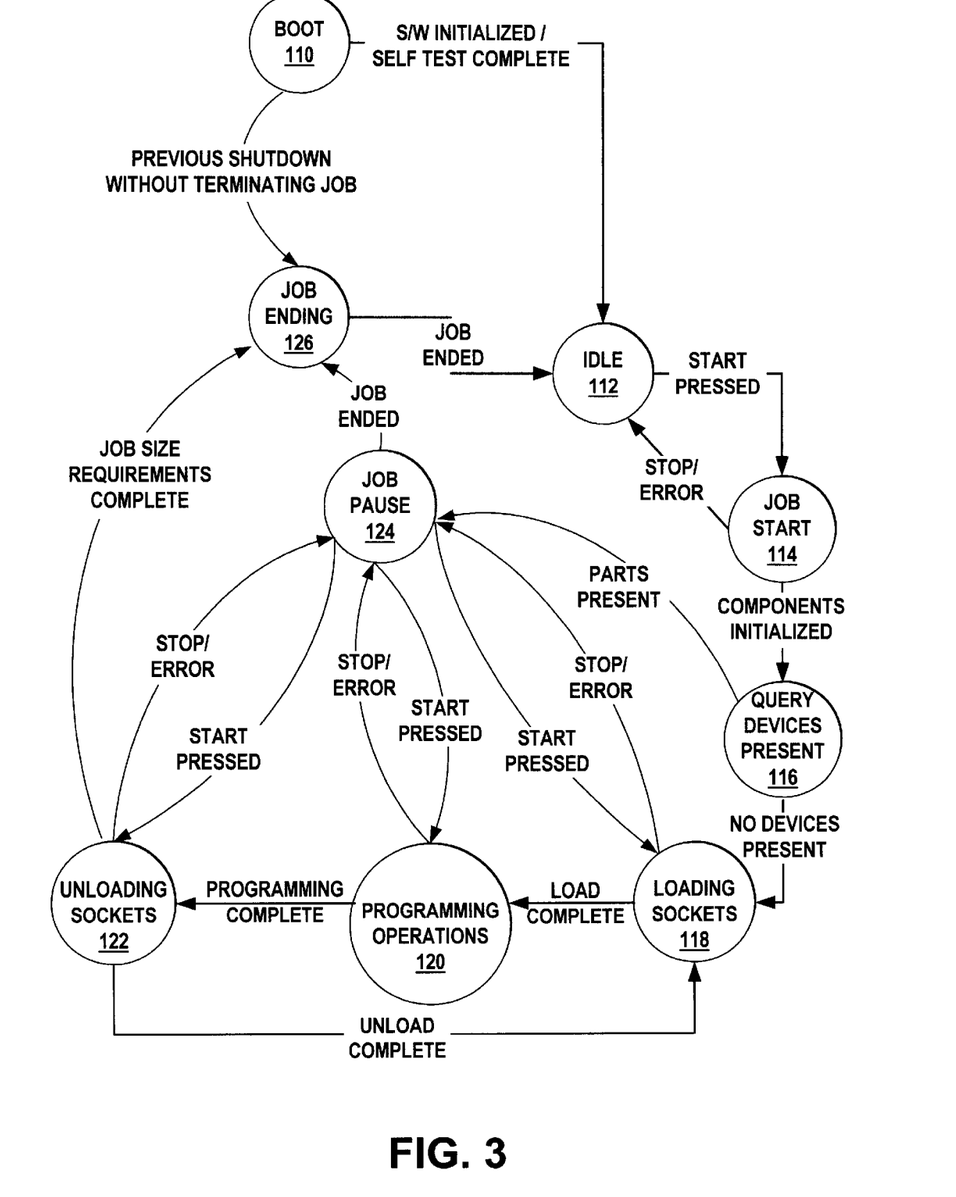
FIG. 3 is a state diagram of the operation of the present invention.

Operation:

In brief summary, FIGS. 1 and 3 show the hardware and FIG. 2 shows the software. The user interface 20 interacts with the control agent 16. The control agent 16 controls the robotic control subsystem 30, the programming control 40 and the job manager control 50. The robotic control subsystem 30 controls the essential operation functions which are the robotic handling system 12 and the output buffer mechanism 14. The programming control 40 controls the programming mechanism 13. The job manager 50 provides information which relate to performing a job.

In operation, the control agent 16 orchestrates all the systems. The control agent 16 provides primary control over the control system 15 and receives inputs from the user interface subsystem 20. When a user uses the keypad 22 to start a job, the control agent 16 will initialize all of the control system 15 and will notify all systems that a job with the characteristics in the job information module 51 is starting.

The control agent 16 will instruct the robotic control subsystem 30 to begin the input unit 31. The control agent 16 then causes the robotic handling unit 34 and the probe control unit 37 of the robotic handling system 12 start loading the programming mechanism 13 with unprogrammed programmable devices and activates the socket manager unit 43. The programming control subsystem 40 instructs the programming mechanism 13 to start programming the programmable devices.

After the programming is done, the control agent 16 then instructs the robotic control subsystem 30 to have programming actuator unit 33 cause the programmable devices to be released and the robotic handling system 12 to start unloading the programming mechanism 13 to place programmed electrical devices on the output buffer mechanism 14 and to start up the output buffer mechanism 14.

Part of the information that the programming control subsystem 40 sends back to the control agent 16 is information on which programmable devices are good and which are bad. The control agent 16 then instructs the robotic control subsystem 30 to reject the bad programmable devices and have the reject bin monitor 35 keep track of the rejects. Once the programmed programmable devices are unloaded and placed on the output unit 32, the control agent 16 then tells the robotic control subsystem 30 to load the sockets again.

In the best mode, where there are four pickup and place probes (not shown) per robotic handling, the robotic control subsystem 30 will have four unprogrammed programmable devices picked up sequentially and inserted in four separate sockets (not shown) in the programming mechanism 13. The programming electronics unit 44 will program the programmable devices. After programming, the robotic handling unit 34 has the probes pick up each of the programmed programmable devices sequentially and will deposit good devices on the output unit 32 and the bad devices in the reject bin. The sequence will then repeat itself.

The control agent 16 also provides information from the error manager 60 to the event log 70 which keeps track of the various problems that the control system 15 has encountered. The control agent 16 has a series of states and every time it changes state, it records the state that it is entering into the event log 70.

Referring now to FIG. 3, therein is shown a state diagram 100 for the control agent 16. There are nine states.

The first state is the boot state 110. The feeder/programming/buffer system enters the boot state 110 when power is applied. All the software components are created and initialized, and the hardware input/output (I/O) is set to a known state. All the system components are placed into a known good state and a self-test is performed on each of the subcomponents. The self-test includes checking to see if there are programmable devices in the robotic handling system 12, the programming mechanism 13, or the output buffer mechanism 14.

The second state, the idle state 112, is entered after completion of the initialization and self-test. The control system 15 waits for an input from the keypad 22 of FIG. 2 or an indication that a job has ended, as will later be explained.

The third state, job start state 114, is entered when the start is pressed on the keypad 22. At this point, all the data from the user interface subsystem 20, the job parameters 55, the executable data 56, the programmable memory manager 80 information, and the portable memory manager 90 information for the particular job are provided to the robotic control subsystem 30 and the programming control subsystem 40.

The fourth state, query devices present state 116, is entered when the system is initialized. In this state, it is determined whether or not there are programmable devices in the feeder/programming system/buffer system 10. If there are any programmable devices in the system, they may be left over from a previous job, the operator is warned through the error manager 60 and the light control 61 to remove the programmable devices or continue with them as part of the then current production run.

The fifth state, loading sockets 118, is entered when the feeder/programming system/buffer system 10 is clear. In this state, programmable devices are moved by the robotic control subsystem 30 from the feeder mechanism 11 and loaded into the programming mechanism 13.

The sixth state is when the control agent 16 moves to the programming operations 120, after the loading is complete. In this state, the programming control subsystem 40 operates with the programming electronics 44 to program the unprogrammed programmable devices. The programming electronics 44 programs the programmable devices.

The seventh state, unloading sockets 122, is entered when the programming is complete. The robotic control subsystem 30 causes the sockets to be unloaded and the defective programmable devices put into the reject bin and the good devices put onto the output buffer mechanism 14.

The eighth state is when the control agent 16 returns to recycling when the unloading is complete and returns to the loading sockets state 118 to recycle through the programming operations 120 and unloading sockets 122.

The ninth state, a job pause state 124, occurs at any time during the cycle upon an error or a stop command from the user. The job pause state 124 will be maintained until the start is pressed on the keypad 22 by the user. If the user restarts the job, the operation would continue uninterrupted.

A stop due to an error from any of the three states of loading sockets 118, programming operations 120, or unloading sockets 122 will cause the error manager 60 to cause the light control 61 to illuminate the blue or red light.

When the job size as indicated by job parameters 55 are reached, the job ending state 126 is entered, and then the idle state 112 is then resumed, and similarly, if the job is stopped prematurely.

If the previous job had been ended by shutting off power before the job was completed, the control system 15 will go immediately to the job ending state 126 and then to the idle state 112 to clean up any job in process before proceeding with a new job.

From the above it will be understood that the present invention is applicable to what can be described as "micro devices". Micro devices include a broad range of electronic and mechanical devices. The best mode describes processing which is programming for programmable devices, which include but are not limited to devices such as Flash memories (Flash), electrically erasable programmable read only memories ($E^2PROM$), programmable logic devices (PLDs), field programmable gate arrays (FPGAs), and microcontrollers. However, the present invention encompasses processing for all electronic, mechanical, hybrid, and other devices which require testing, measurement of device characteristics, calibration, and other processing operations. For example, these types of micro devices would include but not be limited to devices such as microprocessors, integrated circuits (ICs), application specific integrated circuits (ASICs), micro mechanical machines, micro-electro-mechanical (MEMs) devices, micro modules, and fluidic systems.

Further, the invention and parts thereof may be implemented in hardware, firmware, software, or combinations thereof.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A control system for a system having an interconnected micro device feeder, handling, processing, and output mechanisms, comprising:
 a control agent;
 an interface connected to communicate instructions to and from the control agent;
 a robotic control subsystem including:
  an input unit responsive to the control agent to control the micro device feeder mechanism to provide a micro device,
  a robotic subsystem responsive to the control agent to control the handling mechanism for handling the micro device between the feeder and the output mechanisms, and
  an output unit responsive to the control agent to control the output mechanism to output the micro device;
 a processing control subsystem responsive to the control agent to control the processing mechanism to process the micro device; and
 a job manager control connected to the control agent capable of communicating information with the processing control subsystem related to the micro device, the job manager control having a job information module containing:
  job statistics,
  device data, and
  job parameters.

2. The control system as claimed in claim 1 including:
 an error manager capable responding to an error signal from the control agent to provide an indication thereof.

3. The control system as claimed in claim 1 including:
 an event log capable of maintaining information related to an operation of the control agent.

4. The control system as claimed in claim 1 including:
 a non-volatile memory manager for maintaining information related to the input unit, the robotic control subsystem, the processing control subsystem, and the output unit.

5. The control system as claimed in claim 1 including:
 a programmable memory manager for recording information related to the input unit, the robotic control subsystem, the processing control subsystem, and the output unit.

6. The control system as claimed in claim 1 including:
 a communications network link capable of providing information to and from the control agent.

7. The control system as claimed in claim 1 having a portable memory and including:
 a portable memory manager for communicating information with the portable memory and communicating the information to the control agent.

8. The control system as claimed in claim 1 wherein:
 the processing control subsystem is capable of controlling the processing of the micro device with a process selected from a group consisting of programming, calibration, test, and measurement.

9. The control system as claimed in claim 1 including:
 a processing mechanism manager unit capable of enabling and disabling the processing mechanism in response to a fault therein.

10. The control system as claimed in claim 1 wherein:
 the processing control subsystem operates with the robotic control subsystem for rejecting an unprocessed micro device after processing.

11. A control system for a system having an interconnected programmable device feeder, handling, programming, and output mechanisms, comprising:
 a control agent;
 a user interface subsystem connected to communicate instructions to and from the control agent;
 a robotic control subsystem including:
  an input unit responsive to the control agent to control the programmable device feeder mechanism to feed a programmable device, which is unprogrammed,
  a robotic handling unit responsive to the control agent to control the handling mechanism for handling the programmable device among the feeder, the programming, and the output mechanisms, a probe control unit responsive to the control agent for picking and placing the programmable device, a programming actuator unit for controlling the engagement of the programmable device in the programming mechanism, and an output unit responsive to the control agent to control the output mechanism to output the programmable device, which is programmed;

a programming control subsystem responsive to the control agent to control the programming mechanism to program the programmable device; and a job manager control connected to the control agent capable of communicating information with the programming control subsystem related to the programmable device, the job manager control having a job information module containing:
job statistics,
device data, and
job parameters.

12. The control system as claimed in claim 11 wherein: the user interface subsystem includes:
a display,
a keypad, and
a plurality of menu selectors.

13. The control system as claimed in claim 11 for a plurality of programmable devices wherein:
the robotic control subsystem includes a programmable device statistics unit for maintaining statistics on the number in said plurality of programmable devices.

14. The control system as claimed in claim 11 wherein the programming control subsystem includes:
a device operation unit for set up for the programmable device,
a programming algorithm unit for determining operational requirements for the programmable device, and
a programming electronics unit for controlling the programming of the programmable device.

15. The control system as claimed in claim 11 including:
an error manager capable of receiving signals from the control agent and responsive to errors from the programming control subsystem to provide an indication thereof, the error manager including:
a light control for controlling a plurality of lights indicative of different errors.

16. The control system as claimed in claim 11 including:
an event log capable of maintaining information related to an operation and an error from the control agent.

17. The control system as claimed in claim 11 including:
a non-volatile memory manager including a NVRAM for maintaining information related to the input unit, the robotic control subsystem, the programming control subsystem, and the output unit.

18. The control system as claimed in claim 11 including:
a programmable memory manager including an EEPROM for recording information related to the input unit, the robotic control subsystem, the programming control subsystem, and the output unit.

19. The control system as claimed in claim 11 including:
a communications network link capable of providing information to and from the control agent.

20. The control system as claimed in claim 11 having a PCMCIA card and including:
a PCMCIA card manager for communicating information with the PCMCIA card and communicating the information to the control agent.

21. The control system as claimed in claim 11 for a plurality of programmable devices wherein:
the robotic handling unit and the probe control unit are capable of handling a plurality of programmable devices simultaneously; and
the programming control subsystem is capable of controlling the programming of a plurality of programmable devices simultaneously.

22. The control system as claimed in claim 11 wherein:
the programming control subsystem operates with the robotic control subsystem for rejecting an unprogrammed programmable device after programming.

23. A method for controlling a system having an interconnected micro device feeder, handling, processing, and output mechanisms, comprising:
providing a control agent;
communicating instructions to and from the control agent to an interface connected thereto;
providing a robotic control subsystem including:
controlling the micro device feeder mechanism to provide a micro device using an input unit responsive to the control agent,
controlling the handling mechanism for handling the micro device between the feeder and the output mechanisms using a robotic control subsystem responsive to the control agent, and
controlling the output mechanism to output the micro device using an output unit responsive to the control agent;
controlling the processing mechanism to process the micro device using a processing control subsystem responsive to the control agent;
communicating information with the processing control subsystem related to the micro device using a job manager control connected to the control agent; and
providing the job manager control with a job information module containing:
job statistics,
device data, and
job parameters.

24. The method for controlling a system as claimed in claim 23 including:
providing an indication of errors from the processing control subsystem using an error manager capable of receiving signals from the control agent.

25. The method for controlling a system as claimed in claim 23 including:
maintaining information related to an operations of the control agent using an event log.

26. The method for controlling a system as claimed in claim 23 including:
maintaining information related to the input unit, the robotic control subsystem, the processing control subsystem, and the output unit using a non-volatile memory manager.

27. The method for controlling a system as claimed in claim 23 including:
recording information related to the input unit, the robotic control subsystem, the processing control subsystem, and the output unit using a programmable memory manager.

28. The method for controlling a system as claimed in claim 23 including:
providing information to and from the control agent using a communications network link.

29. The method for controlling a system as claimed in claim 23 using a portable memory and including:
communicating information with the portable memory and communicating the information to the control agent using a portable memory manager.

30. The method for controlling a system as claimed in claim 23 wherein:
controlling the processing of the micro device with a process selected from a group consisting of programming, calibration, test, and measurement using the processing control subsystem.

31. The method for controlling a system as claimed in claim 23 including:
a processing mechanism manager unit capable of selectively enabling and disabling portions of the processing mechanism in response to a fault therein.

32. The method for controlling a system as claimed in claim 23 wherein:
rejecting an unprocessed micro device after processing using the processing control subsystem operating with the robotic control subsystem.

33. A method for controlling a system having an interconnected programmable device feeder, handling, programming, and output mechanisms, comprising:
providing a control agent;
communicating instructions to and from the control agent using a user interface subsystem;
providing a robotic control subsystem including:
controlling the programmable device feeder mechanism to feed a programmable device, which is unprogrammed, using an input unit responsive to the control agent,
controlling the handling mechanism for handling the programmable device among the feeder, the programming, and the output mechanisms using a robotic handling unit responsive to the control agent,
picking and placing the programmable device using a probe control unit responsive to the control agent,
controlling the engagement of the programmable device in the programming mechanism using a programming actuator unit, and
controlling the output mechanism to output the programmable device, which is programmed, using an output unit responsive to the control agent;
controlling the programming mechanism to program the programmable device using a programming control subsystem responsive to the control agent;
communicating information with the programming control subsystem related to the programmable device using a job manager control connected to the control agent; and
providing the job manager control with a job information module containing:
job statistics,
device data, and
job parameters.

34. The method for controlling a system as claimed in claim 33 for a plurality of programmable devices including:
maintaining statistics on the number in said plurality of programmable devices using the robotic control subsystem including a programmable device statistics unit.

35. The method for controlling a system as claimed in claim 33 wherein programming control subsystem includes:
setting up for the programmable device using a device operation unit,
determining operational requirements for the programmable device using a programming algorithm unit,
controlling engagement and disengagement of the programmable device in the programming mechanism using a socket manager unit, and
controlling the programming of the programmable device using a programming electronics unit.

36. The method for controlling a system as claimed in claim 33 including:
receiving signals from the control agent and responsive to errors from the programming control subsystem to provide an indication thereof using an error manager; and
controlling a plurality of lights indicative of different errors using a light control in the error manager.

37. The method for controlling a system as claimed in claim 33 including:
maintaining information related to an operation and an error of the control agent using an event log capable.

38. The method for controlling a system as claimed in claim 33 including:
maintaining information related to the input unit, the robotic control subsystem, the programming control subsystem, and the output unit using a non-volatile memory manager including a NVRAM.

39. The method for controlling a system as claimed in claim 33 including:
recording information related to the input unit, the robotic control subsystem, the programming control subsystem, and the output unit using a programmable memory manager including an EEPROM.

40. The method for controlling a system as claimed in claim 33 including:
providing information to and from the control agent using a communications network link.

41. The method for controlling a system as claimed in claim 33 having a PCMCIA card and including:
communicating information with the PCMCIA card and communicating the information to the control agent using a PCMCIA card manager.

42. The method for controlling a system as claimed in claim 33 for a plurality of programmable devices including:
handling a plurality of programmable devices simultaneously using the robotic handling unit and the probe control unit are capable; and
controlling the programming of a plurality of programmable devices simultaneously using the programming control subsystem.

43. The method for controlling a system as claimed in claim 33 including:
rejecting an unprogrammed programmable device after programming using the programming control subsystem operates with the robotic control subsystem.

* * * * *